(12) United States Patent
Hayes et al.

(10) Patent No.: US 6,991,244 B2
(45) Date of Patent: Jan. 31, 2006

(54) INTERLOCKING SUSPENSION BRACKET FOR AN INVERTED PORTAL AXLE

(75) Inventors: Brian D. Hayes, Newark, OH (US); Lawrence D. Brill, Westerville, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 250 days.

(21) Appl. No.: 10/428,506

(22) Filed: May 2, 2003

(65) Prior Publication Data

US 2004/0217572 A1 Nov. 4, 2004

(51) Int. Cl.
*B60G 9/02* (2006.01)
(52) U.S. Cl. .................... 280/124.112; 280/124.116; 280/124.157; 180/349; 180/352; 180/378
(58) Field of Classification Search ......... 280/124.116, 280/124.12, 124.128, 124.13, 124.153, 124.154, 280/124.156, 124.11, 124.112, 124.157; 180/349, 180/352, 378; 301/135
See application file for complete search history.

(56) References Cited

U.S. PATENT DOCUMENTS

| | | | |
|---|---|---|---|
| 2,754,111 A * | 7/1956 | Norrie ...................... 267/189 |
| 4,267,896 A * | 5/1981 | Hendriksen ............... 280/86.75 |
| 4,429,900 A * | 2/1984 | Feher ................... 280/124.128 |
| 4,655,467 A * | 4/1987 | Kitzmiller et al. .......... 280/444 |
| 4,813,702 A * | 3/1989 | Arai et al. ............ 280/124.104 |
| 5,678,845 A * | 10/1997 | Stuart ................... 280/124.116 |
| 6,109,630 A * | 8/2000 | Dazy et al. ............. 280/124.11 |
| 6,264,231 B1 * | 7/2001 | Scully ......................... 280/680 |
| 6,352,245 B1 * | 3/2002 | Norden ..................... 267/36.1 |
| 6,428,027 B1 * | 8/2002 | Stuart .................. 280/124.157 |
| 6,702,325 B1 * | 3/2004 | Pierce ......................... 280/788 |
| 6,733,020 B2 * | 5/2004 | Reineck ............... 280/124.107 |
| 6,805,369 B2 * | 10/2004 | Galazin ............... 280/124.116 |

* cited by examiner

*Primary Examiner*—David R. Dunn
*Assistant Examiner*—Toan C. To
(74) *Attorney, Agent, or Firm*—Carlson, Gaskey & Olds

(57) ABSTRACT

An axle assembly is provided that includes an axle. The axle assembly may be of an inverted portal axle configuration. The axle includes a boss having a threaded aperture. A suspension component, such as a suspension arm, may be secured to the axle by a fastener received by the threaded aperture. A bracket may be arranged in engagement with the boss between the suspension arm and the axle. The bracket may be used to connect a torsion bar to the axle. The bracket includes an aperture with the fastener disposed within the bracket aperture. The fastener, which is common for the suspension arm and bracket, creates a clamping load on the bracket. Moreover, the suspension arm and the torsion bar bracket share a common boss.

11 Claims, 4 Drawing Sheets

INTERLOCKING SUSPENSION BRACKET FOR AN INVERTED PORTAL AXLE

BACKGROUND OF THE INVENTION

The present invention relates to axle assemblies in vehicles having brackets secured thereto.

In general, conventional axle assemblies have many components secured to the axle connecting the axle to the vehicle frame.

The components interconnecting the axle to the frame provide the desired suspension geometry and damping characteristics for the suspension assembly. For example, shock absorbers may be supported on the axle and connected to the frame to dampen inputs from the roadway. Suspension arms may be connected to the axle to provide a desired suspension geometry and support air springs that provide a desired spring rate. Furthermore, torque rods may be attached to the axle to further determine the suspension geometry during articulation of the axle relative to the vehicle frame.

Inverted portal axles are typically used for bus applications to enable a lower floor height in the aisle between the passenger seats. Typically, one or more bosses are machined on the axle to provide attachment points for the suspension arms, which are secured to the axle by fasteners. Similarly, additional bosses are machined onto the axle to provide support for torque rods or other suspension components. In the case of torque rods for an inverted portal axle, brackets have been secured to these additional bosses, which are remote from the suspension arm bosses, and the torque rods are secured to the brackets using additional fasteners.

Several drawbacks exist with the above arrangement. The area available on the axle to accommodate each component is rather limited. This in turn limits the number of components that may be accommodated on the axle and also the position on the axle where the components may be located. Second, each component secured to the axle has typically required machining the axle to create a boss, which is costly. Moreover, each component attached to the axle has required a separate set of fasteners. As a result, prior art axle assemblies have reduced design flexibility and increased component costs and manufacturing time.

Therefore, what is needed is an improved arrangement for securing components to the axle while minimizing machining and fasteners to reduce cost.

SUMMARY OF THE INVENTION

The present invention provides an axle assembly that includes an axle. The axle assembly may be of an inverted portal axle configuration. The axle includes a boss having a threaded aperture. A suspension component, such as a suspension arm, may be secured to the axle by a fastener received by the threaded aperture. A bracket may be arranged in engagement with the boss between the suspension arm and the axle. The bracket may be used to connect a torsion bar to the axle. The bracket includes an aperture with the fastener disposed within the bracket aperture. The fastener, which is common for the suspension arm and bracket, creates a clamping load on the bracket. Moreover, the suspension arm and the torsion bar bracket share a common boss.

Accordingly, the present invention provides an improved arrangement for securing components to the axle while minimizing machining and fasteners to reduce cost.

DETAILED DESCRIPTION OF THE PREFFERRED EMBODIMENT

Figure 1:
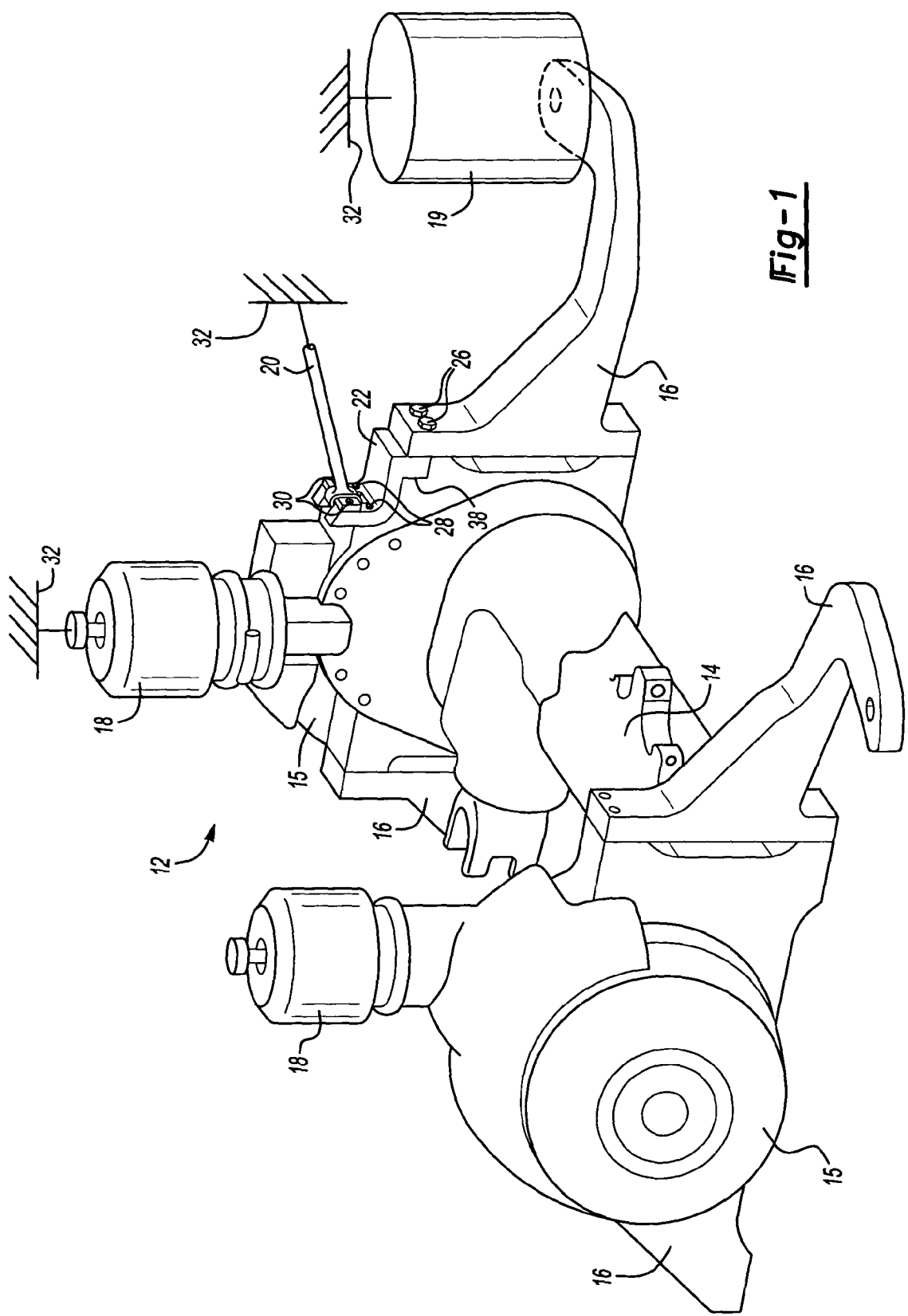
FIG. 1 is a general perspective view of the invention in the axle assembly.

FIG. 1 depicts an inverted portal axle assembly 12 of a bus. One of ordinary skill in the art, however, will appreciate the applicability of the present invention to other mounting applications. The assembly 12 includes an axle 14 having two pairs of opposing suspension arms 16 secured to the axle 14. The suspension arms 16 support air springs 19 (only one of which is shown) that are connected to the vehicle frame 32. The suspension arms 16 define a desired suspension geometry, and the springs 19 provide a desired spring rate. Shock absorbers 18 are connected between the axle 14 and the vehicle frame 32 to dampen inputs from the roadway. Torque rods 20 (only one of which is shown) are connected between the axle 14 and vehicle frame 32 to define a suspension geometry during articulation of the assembly 12.

Figure 2:
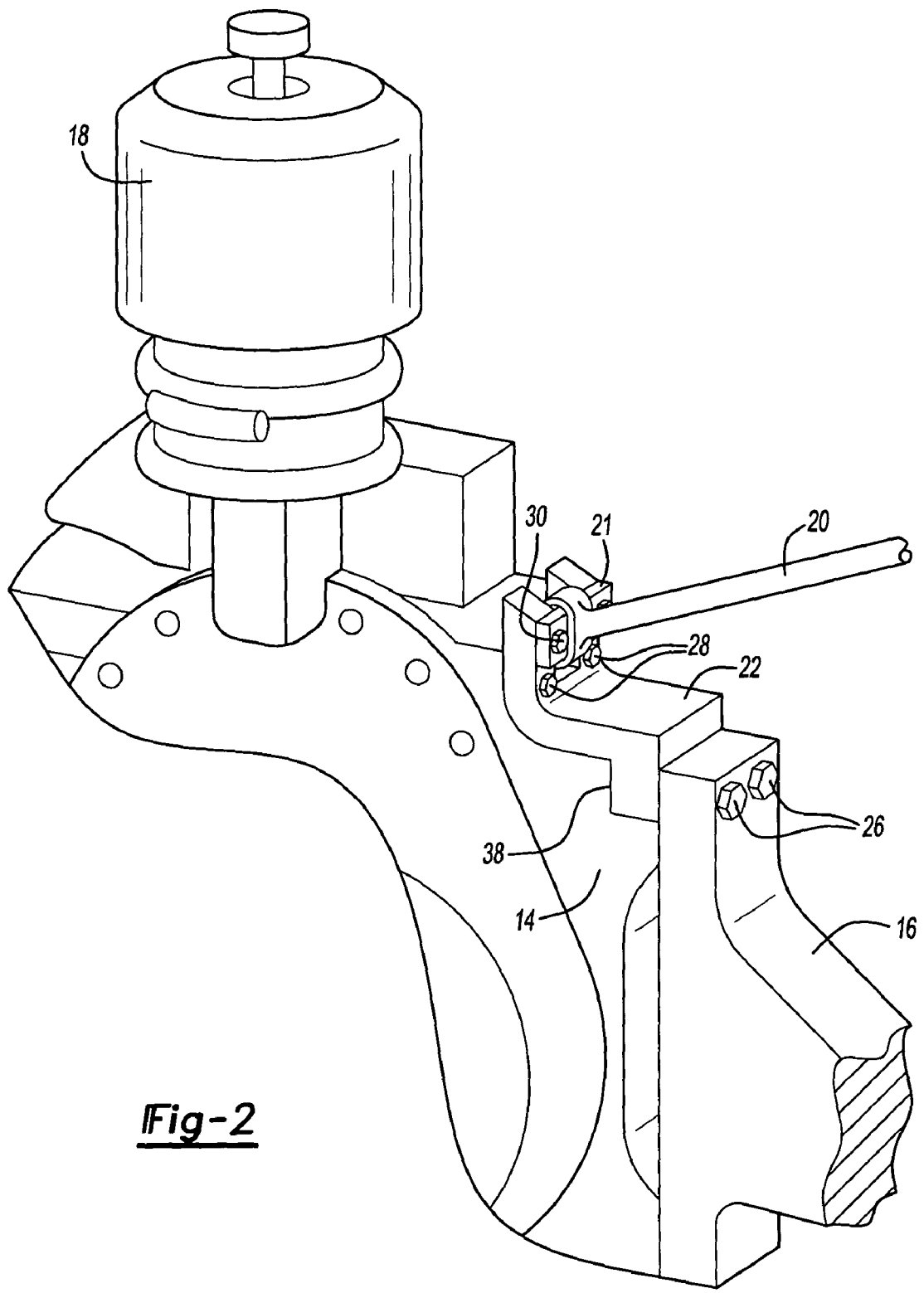
FIG. 2 is a larger view of the bracket according to the invention.

FIG. 2 depicts an exploded view of the invention. The suspension arm 16 is secured to the axle 14 using fasteners 26. A torque rod bracket 22 connects the torque rod 20 to the axle 14. A portion of the bracket 22 is interposed between the suspension arm 16 and the axle 14, which is advantageous because the area on the axle 14 to secure such components is limited. By sharing a common attachment point 38 or boss on the axle with the suspension arm 16, the bracket 22 requires less area on the axle 14 and the axle machining is reduced thereby saving cost.

Prior art brackets utilize dedicated fasteners in which the fasteners only secure that bracket. However, the fasteners 26 are shared between the bracket 22 and suspension arm 16 and serve the dual purpose of securing the bracket 22 and suspension arm 16 to the axle 14. Sharing of fasteners 26 in this manner is advantageous since the overall number of fasteners in the assembly is reduced thereby reducing cost and assembly time.

The bracket 22 may extend away from the suspension arm 16 to provide an additional attachment in close proximity to the shared attachment point 38 with the suspension arm 16. The bracket 22 may also be secured to the axle 14 using fasteners 28, and the torque rod 20 may be secured to the bracket 22 using fasteners 30. As a result, the bracket 22 is secured to the axle using a set of fasteners 28 and a set of fasteners 26 which are shared with the suspension arm 16. However, the present invention arrangement still permits a reduced number of fasteners and common attachment points.

Figure 3:
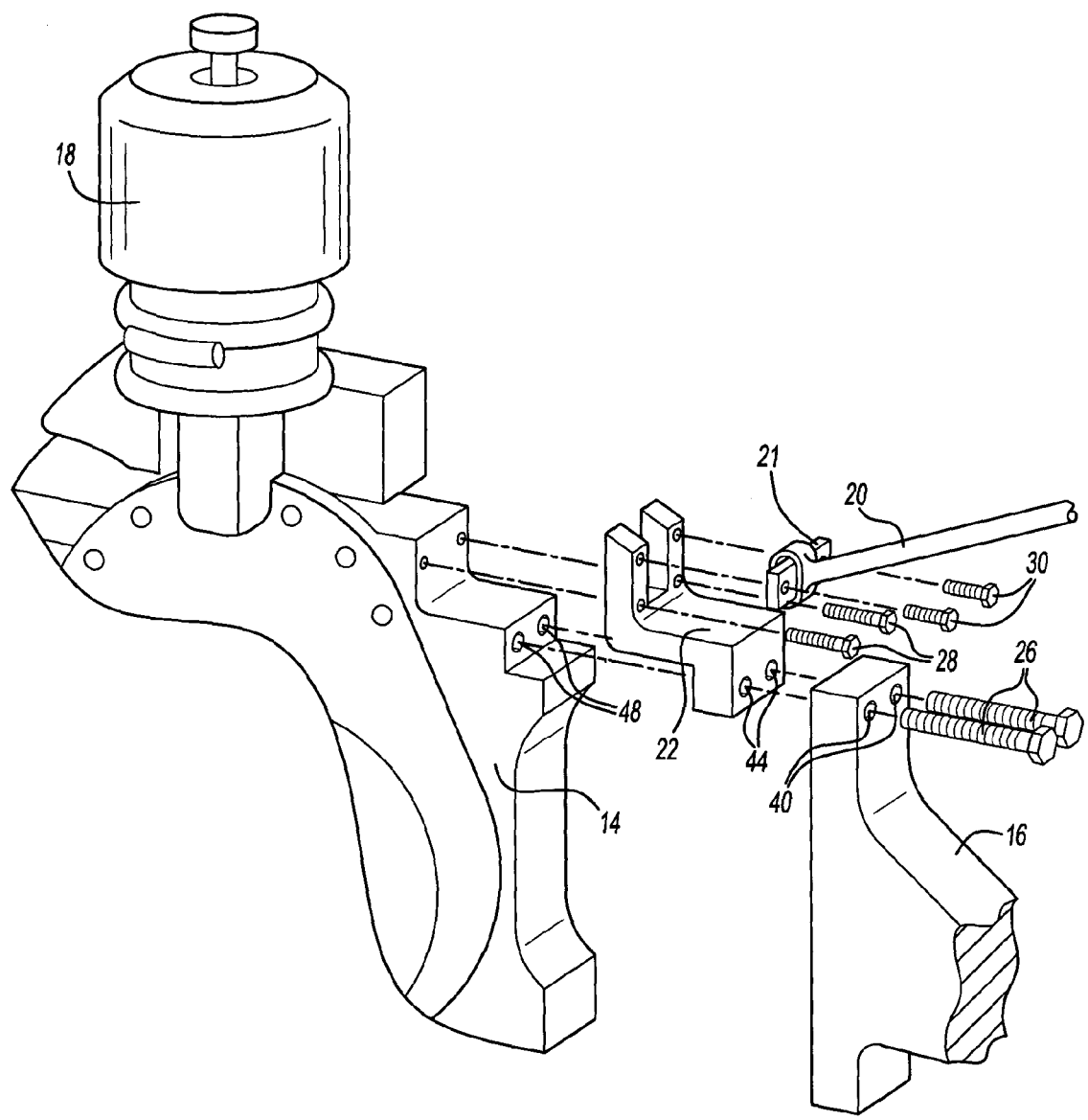
FIG. 3 shows an embodiment of the invention where the bracket is interposed between the axle and suspension arm, the axle, bracket, and suspension arm share a set of two fasteners, and the axle and bracket share second set of two fasteners.
Figure 4:
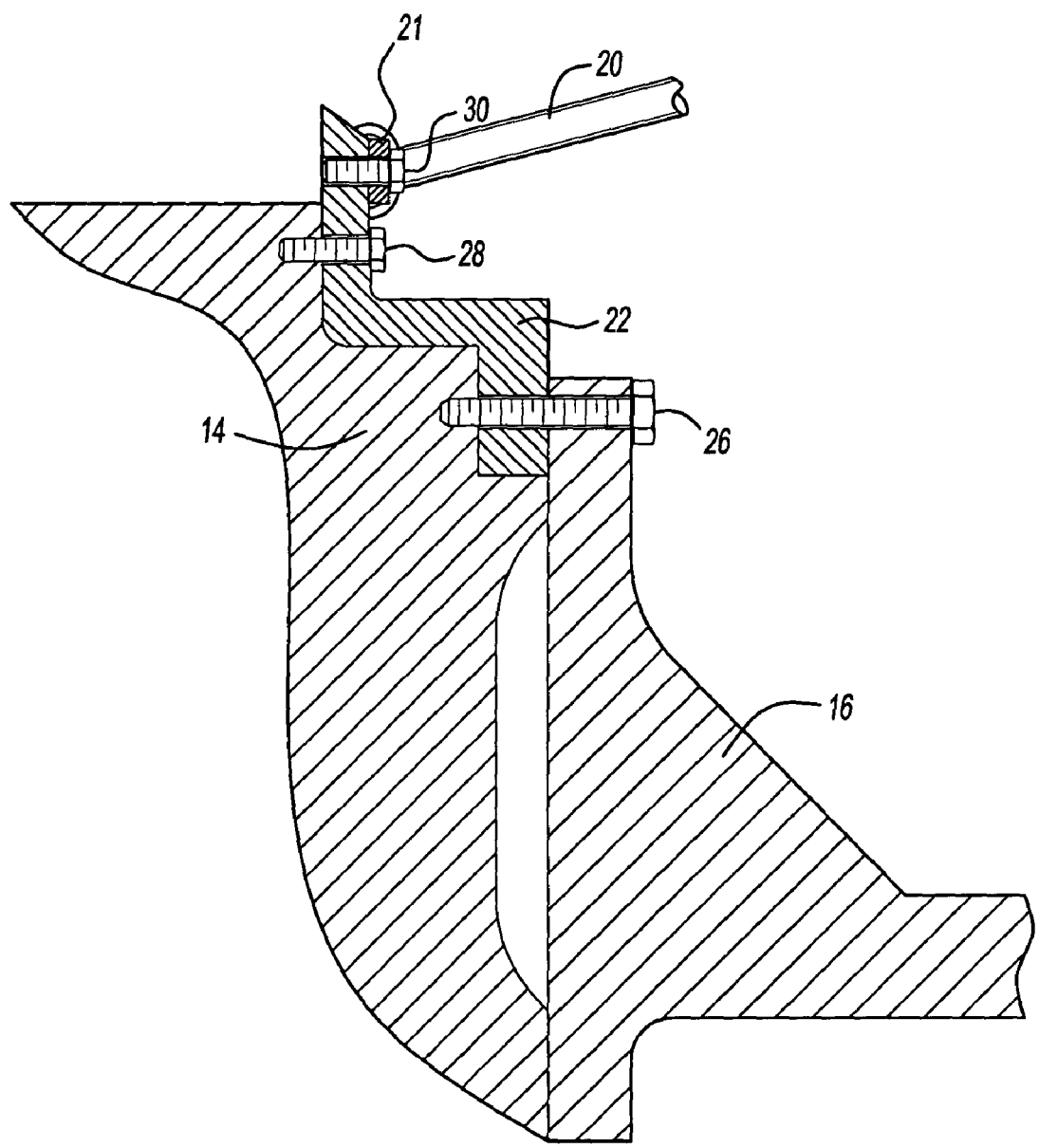
FIG. 4 is a side view section of the embodiment of FIG. 3.

FIGS. 3 and 4 further depict the shared fasteners 26 disposed within suspension arm apertures 40, torque bracket apertures 44, and threaded axle apertures 48 in order to secure all three components using a common fastener 26. The axle 14 and suspension arm 16 exert a clamping force on the interposed bracket 22. Furthermore, the clamping force over the area of the interposed bracket portion, as opposed to force over a localized area such as with a dedicated fastener, is greater thereby providing a more secure attachment of the bracket 22 to the axle 14.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An axle assembly comprising:
   an axle having a first aperture;
   a first suspension component having a second aperture;
   a bracket having a third aperture and a torque rod attached to said bracket; and
   a fastener disposed within said first, second, and third apertures to secure said bracket and said first suspension component to said axle.

2. The axle assembly of claim 1 wherein said bracket is interposed between said axle and said first suspension component.

3. The axle assembly of claim 2 wherein said axle and said first suspension component exert a clamping force on said bracket.

4. The axle assembly of claim 1 wherein said first suspension component is a suspension arm.

5. An axle assembly comprising:
   an axle having a first aperture;
   a first suspension component having a second aperture;
   a bracket having a third aperture; and
   a fastener disposed within said first, second, and third apertures to secure said bracket and said first suspension component to said axle, wherein a portion of said bracket extends away from said first suspension component and said portion is secured to said axle with a second fastener.

6. An axle assembly comprising:
   an axle having a threaded aperture;
   a first suspension component having another aperture;
   a bracket interposed between said axle and said first suspension component; and
   a first fastener disposed within said another aperture and threadingly received by said threaded aperture to secure said first suspension component to said axle.

7. The axle assembly of claim 6 wherein said axle and said first suspension component exert a clamping force on said bracket.

8. The axle assembly of claim 6 having a second suspension component attached to said bracket by a second fastener extending through said bracket and into said axle securing said second suspension component and bracket to said axle.

9. The axle assembly of claim 8 wherein said second suspension component is a torque rod.

10. An axle assembly comprising:
    an axle having a first aperture;
    a first suspension component having a second aperture;
    a bracket interposed between said axle and said first suspension component; and
    a fastener disposed within said first and second apertures to secure said suspension component to said axle, wherein said first suspension component is a suspension arm.

11. An axle assembly comprising:
    an axle having a first aperture;
    a first suspension component having a second aperture;
    a bracket interposed between said axle and said first suspension component; and
    a fastener disposed within said first and second apertures to secure said suspension component to said axle, wherein a portion of said bracket extends away from said first suspension component and said portion is secured to said axle with a second fastener.

* * * * *